Figure 3:
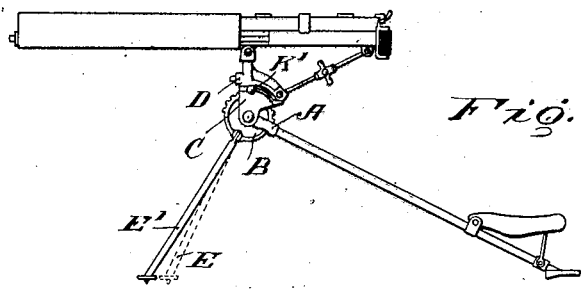

L. SCHMEISSER.
GUN SUPPORT.
APPLICATION FILED JULY 21, 1911.
1,033,624.
Patented July 23, 1912.
2 SHEETS—SHEET 1.
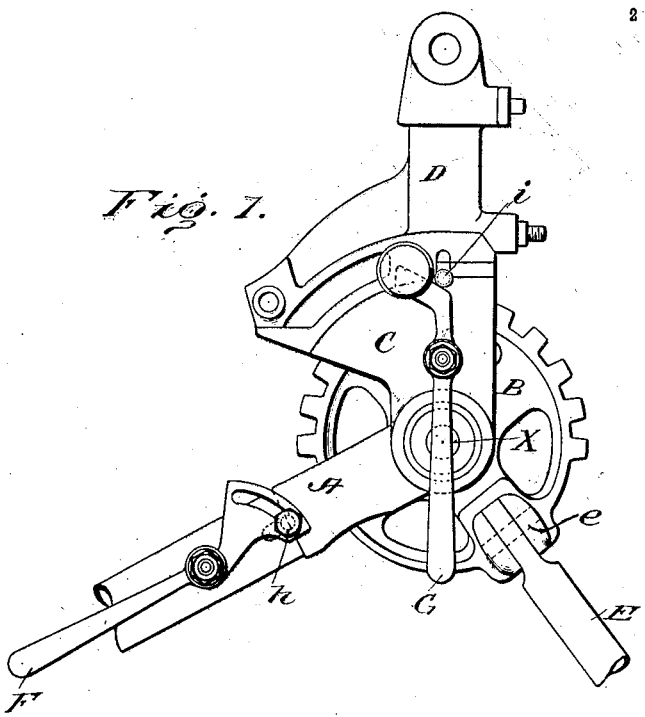
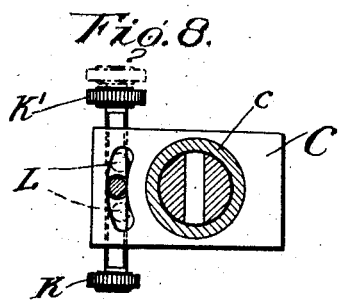
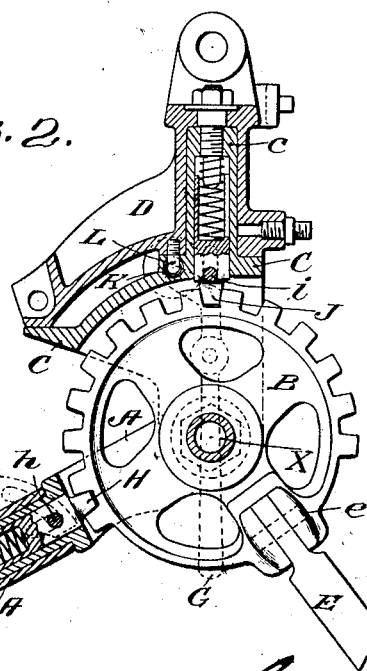
Witnesses
Inventor
By
Attorney

L. SCHMEISSER.
GUN SUPPORT.
APPLICATION FILED JULY 21, 1911.

1,033,624.

Patented July 23, 1912.
2 SHEETS—SHEET 2.

Witnesses

Inventor

By

Attorney

UNITED STATES PATENT OFFICE.

LOUIS SCHMEISSER, OF ERFURT, GERMANY.

GUN-SUPPORT.

1,033,624.

Specification of Letters Patent.  Patented July 23, 1912.

Application filed July 21, 1911. Serial No. 639,784.

*To all whom it may concern:*

Be it known that I, LOUIS SCHMEISSER, a subject of the German Emperor, residing at Erfurt, 8 Strassburgerstrasse, Germany, have invented certain new and useful Improvements in Gun-Supports; and I do hereby declare the following to be a full, clear, and exact description of the invention, such as will enable others skilled in the art to which it appertains to make and use the same.

The present invention refers to tripods for supporting guns.

The object of the invention is to provide means by which a gun supported on a tripod can be bodily raised and lowered and also given any desired elevation.

My invention consists in mechanism forming the head of the tripod and being adapted to permit the angle embraced between the two front legs of the tripod and the rear leg and also the angle embracing the gun support and the legs of the tripod to be varied according to requirements.

In the drawing Figure 1 is a side elevation of the tripod head forming the subject of my invention and Fig. 2 a similar view partly in section. Figs. 3 to 6 are side elevations of the entire gun mounted on a tripod according to my invention in different positions and Fig. 7 an illustration of the tripod when folded up for the purpose of transportation. Fig. 8 is a detail in horizontal section, showing means for securing lateral adjustment.

The same letters of reference designate the same parts in all the figures.

The rear leg of the tripod has a forked head A carrying a pin X upon which is journaled a toothed disk B to rotate freely. At one point of the circumference of the disk B pins $e$ are tangentially fixed on which the front legs of the tripod A, $A_1$ are pivoted so that they can be either brought to a parallel position or else spread out to embrace any suitable angle. The pin X projects on either side of the forked head A and the projecting parts form journals to receive a forked head C forming the lower part of the support adapted to carry the gun barrel. The upper part D of the support is journaled upon an upright pivot $c$ fixed to or integral with the lower forked part C.

The pivot $c$ is made hollow and embraces a spring pressed pawl J adapted to engage the teeth of disk B. In the head of the pawl J is fixed a pin $i$ resting on a beveled surface on the outer end of an arm of a hand lever G. Thus by manipulating the lever G the pawl J can be retracted to enable the support to be swung on pin X so as to give the gun the required elevation. The stem of the forked head A of the rear leg of the tripod is also made hollow and contains a similar spring pressed pawl H with a pin $h$ controlled by a hand lever F having a curved slot in its inner arm as shown in Fig. 1.

By means of screws K, $K_1$ threaded into a bore in part C and acting upon a pin L fixed on the part D and projecting through a slot into the bore the lateral direction of the gun can be limited or fixed according to requirements (see Fig. 8).

Figure 4:
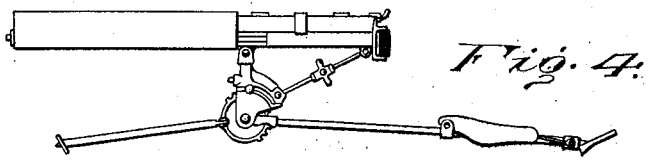
Figure 5:
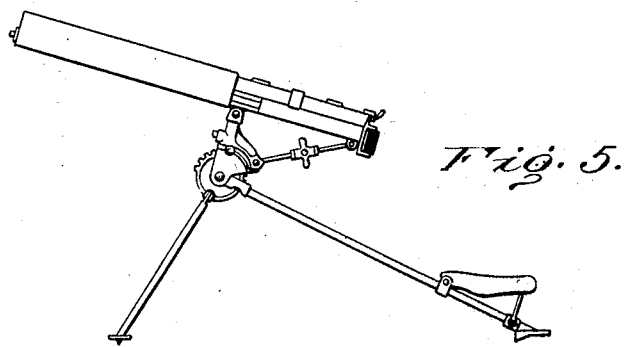
Figure 6:
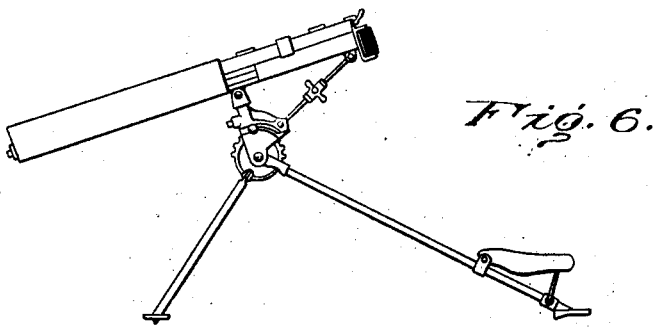
Figure 7:
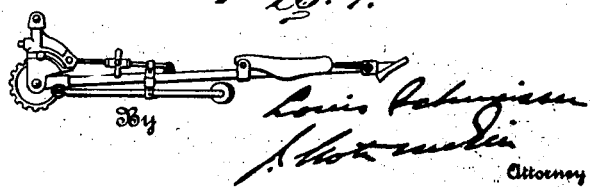

By withdrawing pawl H from the teeth of disk B and shifting fork A the angle embraced between the front legs and rear legs of the tripod can be varied between the positions shown in Figs. 3 and 4, thus raising or lowering the gun according to requirement. By withdrawing pawl J by means of lever G and shifting fork C to different positions the elevation of the gun can be varied between the positions shown in Figs. 5 and 6. When the gun is to be packed up for transportation the tripod and support can be folded up as shown in Fig. 7.

Having now particularly described and ascertained the nature of my said invention and in what manner the same is to be performed, I declare that what I claim is:—

1. In a gun support, a tripod comprising a pair of front legs, a rear leg, a barrel support, a common pivot upon which the two sets of legs and the barrel support are independently rotatable, and means for locking the said parts in any desired relative position.

2. In a gun support, a tripod comprising a pair of front legs, a rear leg, a barrel support, a disk attached to the front legs, said disk carrying a pin forming a common pivot for the rear leg and the barrel support, and means for locking the rear leg and the barrel support to said disk in any required position.

3. In a gun support, a tripod comprising a pair of front legs, a rear leg, a barrel support, a toothed disk attached to the front legs and provided with a pin acting as a common pivot for the rear leg and the barrel support, and spring pressed locking members mounted in said rear leg and barrel support and adapted to engage the teeth of said disk.

4. In a gun support, a tripod comprising a pair of front legs, a rear leg, a barrel support, said rear leg and barrel support having spaced-apart portions, a toothed disk attached to the front legs and being embraced by the spaced-apart portions of the rear leg and the barrel support, a pin located axially of said disk and passing through said spaced-apart portions, and spring-pressed members mounted to move radially of said pin and adapted to engage the teeth of said disk.

5. In a gun support, a tripod comprising a pair of front legs, a rear leg, a barrel support, a toothed disk to which said front legs are jointed so as to be movable laterally to embrace different angles, a pin located axially of said disk, and adapted to form a common pivot for said barrel support and rear leg, spring-pressed pawls mounted on the barrel support and rear leg and designed to move radially with respect to the disk and adapted to engage the teeth thereof, and means for retracting said pawls.

In testimony whereof, I have signed this specification in the presence of two subscribing witnesses.

LOUIS SCHMEISSER.

Witnesses:
  WOLDEMAR HAUPT,
  HENRY HASPER.